(12) United States Patent
Choi

(10) Patent No.: US 9,864,540 B2
(45) Date of Patent: Jan. 9, 2018

(54) INTERFACE CIRCUIT FOR COMMUNICATION, AND SYSTEM INCLUDING THE SAME

(71) Applicant: SK hynix Inc., Icheon-si Gyeonggi-do (KR)

(72) Inventor: Joon Yong Choi, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 226 days.

(21) Appl. No.: 14/870,383

(22) Filed: Sep. 30, 2015

(65) Prior Publication Data

US 2017/0017432 A1 Jan. 19, 2017

(30) Foreign Application Priority Data

Jul. 13, 2015 (KR) ........................ 10-2015-0099350

(51) Int. Cl.
*G06F 3/06* (2006.01)

(52) U.S. Cl.
CPC .......... *G06F 3/0638* (2013.01); *G06F 3/0604* (2013.01); *G06F 3/0673* (2013.01)

(58) Field of Classification Search
CPC ............. H04L 27/2695; H04L 27/2647; H04L 7/0087; G06F 3/0604; G06F 3/0638; G06F 3/0673; H03M 13/2993
See application file for complete search history.

(56) References Cited

U.S. PATENT DOCUMENTS

| 8,638,655 B2 | 1/2014 | Geile | |
| 9,020,012 B1* | 4/2015 | Morein | H04L 25/4923 375/219 |
| 9,496,879 B1* | 11/2016 | Duan | H04L 7/033 |
| 2013/0241759 A1* | 9/2013 | Wiley | G08C 19/16 341/173 |
| 2015/0043358 A1* | 2/2015 | Wiley | H04L 1/0014 370/242 |

FOREIGN PATENT DOCUMENTS

WO WO 2000/008767 A1 * 2/2000 ........ H03M 13/2993

* cited by examiner

*Primary Examiner* — Mohamed Kamara
(74) *Attorney, Agent, or Firm* — William Park & Associates Ltd.

(57) ABSTRACT

A system may include a processor and a memory. The processor and the memory may communicate with each other in a balanced code multiphase signal transmission scheme. The processor and the memory may include interface circuits, respectively. The interface circuit may generate data based on multiphase symbols. For example, the interface circuit may include a decoding block which generates 5-bit data based on 2 symbols which are successively inputted.

18 Claims, 6 Drawing Sheets

FIG.4

| First symbol | Second symbol | Third symbol | Fourth symbol | Fifth symbol | Sixth symbol | Seventh symbol | Eighth symbol |
|---|---|---|---|---|---|---|---|

First 5-bit data / Second 5-bit data / Third 5-bit data / Fourth 5-bit data

| | Second symbol | | | | | | |
|---|---|---|---|---|---|---|---|
| First symbol | | +x | -x | +y | -y | +z | -z |
| | | 100 | 011 | 010 | 101 | 001 | 110 |
| +x | 100 | 10100 | 10011 | 10010 | 10101 | 10001 | 10110 |
| -x | 011 | 01100 | 01011 | 01010 | 01101 | 01001 | 01110 |
| +y | 010 | 00100 | 00011 | 00010 | 00101 | 00001 | 00110 |
| -y | 101 | 11100 | 11011 | 11010 | 11101 | 11001 | 11110 |
| +z | 001 | 10000 | 01000 | 00000 | 11000 | DM | |
| -z | 110 | 10111 | 01111 | 00111 | 11111 | | |

INTERFACE CIRCUIT FOR COMMUNICATION, AND SYSTEM INCLUDING THE SAME

CROSS-REFERENCES TO RELATED APPLICATION

The present application claims priority under 35 U.S.C. §119(a) to Korean application number 10-2015-0099350, filed on Jul. 13, 2015, in the Korean Intellectual Property Office, which is incorporated herein by reference in its entirety.

BACKGROUND

1. Technical Field

Various embodiments generally relate to a communication system, and more particularly, to an interface circuit for communication and a system including the interface circuit for the communication.

2. Related Art

Electronic products for personal uses, such as a personal computer, a tablet PC, a laptop computer and a smart phone, may be constructed by various electronic components. Two different electronic components in the electronic products may communicate at a high speed to process a large amount of data within a short time. The electronic components may generally communicate through interface circuits. The electronic components may communicate in various schemes, and a serial communication scheme is an example.

As the performances of electronic components are improved, necessity for a communication scheme capable of increasing a bandwidth and reducing power consumption is being increased. In order to meet such necessity, various new serial communication schemes are suggested in the art, and improved interface circuits for supporting the new serial communication schemes are being developed.

SUMMARY

In an embodiment, an interface circuit may be provided. The interface circuit may include a decoding block configured to successively receive symbols and each of the symbols having phases, and generate data having a number of bits based on the symbols. The data of a byte including the number of bits may be masked where a combination of the symbols corresponds to data masking information.

In an embodiment, a system may be provided. The system may include a processor. The system may include a memory configured to communicate with the processor through a wire bus. The memory may include a receiver configured to generate multiphase symbols based on states of the wire bus. The memory may include a decoding block configured to generate data, based on multiphase symbols which are successively inputted. The memory may mask data of a byte including a number of bits, i where a combination of the multiphase symbols corresponds to data masking information.

BRIEF DESCRIPTION OF THE DRAWINGS

FIG. 4 is a representation of an example of a table to assist in the explanation of an operation of converting multiphase symbols into data in accordance with an embodiment.

DETAILED DESCRIPTION

Hereinafter, an interface circuit for communication and a system including the same may be described below with reference to the accompanying drawings through various examples of embodiments.

Various embodiments may be directed to an interface circuit including a scheme for efficiently configuring data by the unit of a byte when converting symbols into data, and a system including the same.

Figure 1:
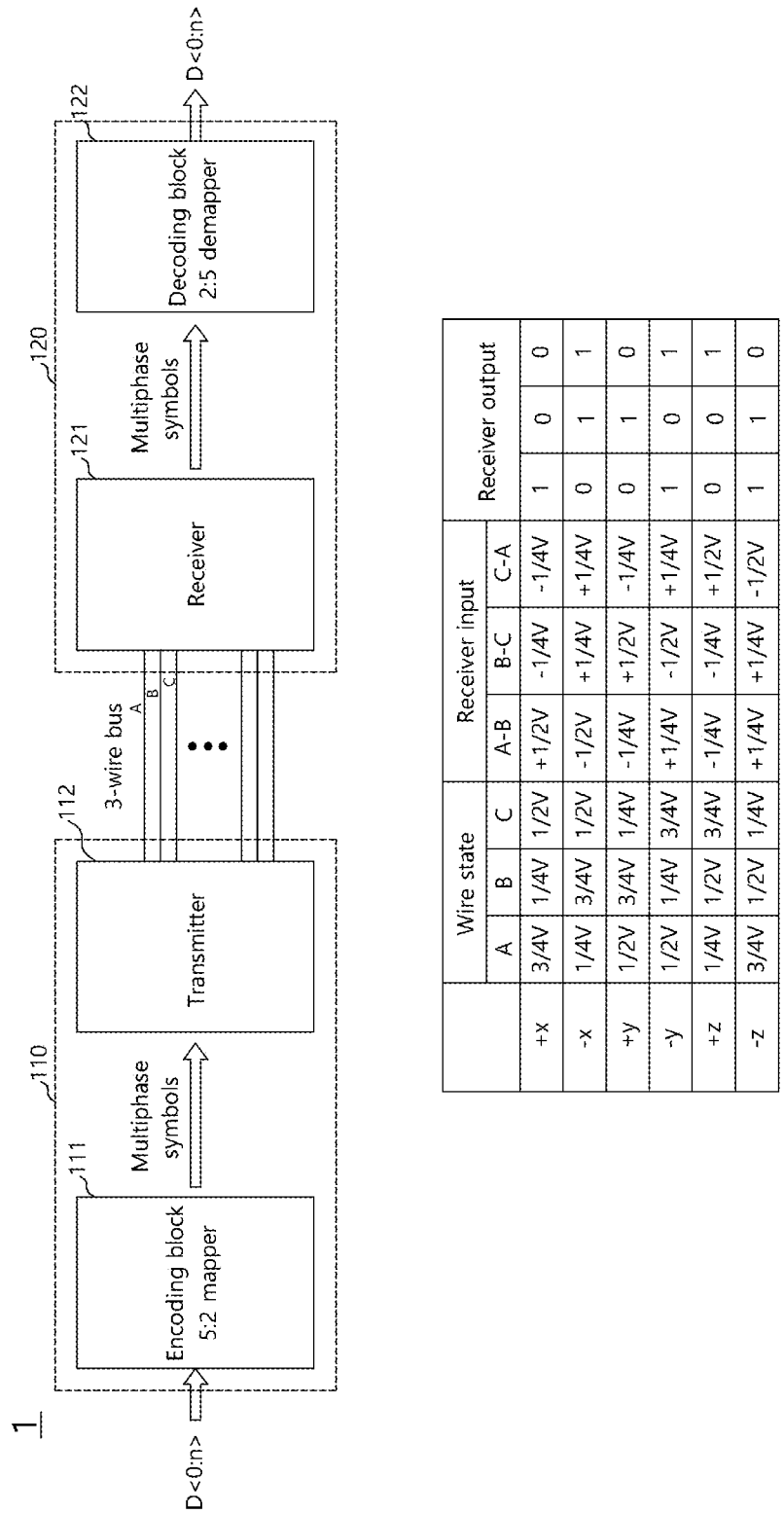
FIG. 1 is a diagram illustrating a representation of an example of the configuration of a system in accordance with an embodiment.

Referring to FIG. 1, a system 1 in accordance with an embodiment may include a master device 110 and a slave device 120. The master device 110 may be a host device configured to control the slave device 120. The master device 110 may perform a calculation operation, and may generate various control signals for controlling the slave device 120. The slave device 120 may perform various operations by being controlled by the master device 110. The master device 110 and the slave device 120 may configure one link. The master device 110 and the slave device 120 may communicate through sub links. For example, the master device 110 and the slave device 120 may include interface circuits, respectively, to communicate at a high speed. The master device 110 and the slave device 120 may be coupled through signal transmission lines, and may exchange signals through the signal transmission lines and the interface circuits.

The system 1 in accordance with an embodiment may communicate in, for example but not limited to, a balanced code multiphase signal transmission scheme. The master device 110 and the slave device 120 may be coupled through a wire bus. The wire bus may include a plurality of wire groups, and each wire group may include a plurality of wires. For example, the wire bus may be a 3-wire bus, and each wire group may include 3 wires. The 3 wires of each wire group may be driven to voltage levels corresponding to a symbol to be transmitted from the master device 110 to the slave device 120 or from the slave device 120 to the master device 110. The 3 wires of each wire group may be driven to a high level, a middle level and a low level to transmit the symbol. For example, the high level may be a voltage level corresponding to ¾ V, the middle level may be a voltage level corresponding to ½ V, and the low level may be a voltage level corresponding to ¼ V. However the embodiments are not limited in this manner and different voltage levels may be used for the high, middle, and low voltage levels. The high voltage level greater than the middle voltage level. The middle voltage level less than the high voltage level and greater than the low voltage level. The low voltage level less than the middle voltage level.

Referring to FIG. 1, the master device 110 may include an encoding block 111 and a transmitter 112. The encoding block 111 and the transmitter 112 may be an interface circuit for balanced code multiphase signal transmission. The encoding block 111 may encode data D<0:n> into a plurality of multiphase symbols. In an embodiment, n may be an integer greater than zero. The encoding block 111 may be, for example but not limited to, a 5:2 mapper which converts 5-bit data into 2 multiphase symbols. The transmitter 112 may receive the plurality of multiphase symbols outputted from the encoding block 111. The transmitter 112 may change the voltage levels or states of the 3-wire bus according to the multiphase symbols. The multiphase symbols may be, for example, 3-phase symbols, and each symbol may include 3 phases. The 3-phase symbols may include first to sixth symbols. The first to sixth symbols may be defined as +x, −x, +y, −y, +z and −z. The first symbol +x may have the phases of 1, 0, 0, the second symbol −x may have the phases of 0, 1, 1, the third symbol +y may have the phases of 0, 1, 0, the fourth symbol −y may have the phases of 1, 0, 1, the fifth symbol +z may have the phases of 0, 0, 1, and the sixth symbol −z may have the phases of 1, 1, 0. Since the transmitter 112 should change the voltage levels or states of the 3-wire bus according to the multiphase symbols, the transmitter 112 may not use a symbol which has the phases of 0, 0, 0 or 1, 1, 1.

In order to transmit the first symbol +x, the transmitter 112 may change the states of 3 wires A, B and C to the high level of ¾ V, the low level of ¼ V and the middle level of ½ V, respectively. In order to transmit the second symbol −x, the transmitter 112 may change the states of 3 wires A, B and C to the low level of ¼ V, the high level of ¾ V and the middle level of ½ V, respectively. In order to transmit the third symbol +y, the transmitter 112 may change the states of 3 wires A, B and C to the middle level of ½ V, the high level of ¾ V and the low level of ¼ V, respectively. In order to transmit the fourth symbol −y, the transmitter 112 may change the states of 3 wires A, B and C to the middle level of ½ V, the low level of ¼ V and the high level of ¾ V, respectively. In order to transmit the fifth symbol +z, the transmitter 112 may change the states of 3 wires A, B and C to the low level of ¼ V, the middle level of ½ V and the high level of ¾ V, respectively. In order to transmit the sixth symbol −z, the transmitter 112 may change the states of 3 wires A, B and C to the high level of ¾ V, the middle level of ½ V and the low level of ¼ V, respectively.

The slave device 120 may include a receiver 121 and a decoding block 122. The receiver 121 and the decoding block 122 may be an interface circuit for, for example but not limited to, balanced code multiphase signal reception. The receiver 121 may be coupled with the 3-wire bus, and may receive the plurality of multiphase symbols according to the voltage levels of the 3-wire bus. While not illustrated, the receiver 121 may include 3 differential buffers in correspondence to 3 wires. The 3 differential buffers may be coupled with at least 2 of 3 wires A, B and C. For example, a first differential buffer may output the first phase of a multiphase symbol by differentially amplifying the voltage level difference A−B of the first wire and the second wire, a second differential buffer may output the second phase of the multiphase symbol by differentially amplifying the voltage level difference B−C of the second wire and the third wire, and a third differential buffer may output the third phase of the multiphase symbol by differentially amplifying the voltage level difference C−A of the third wire and the first wire. Therefore, the receiver 121 may output the same multiphase symbols as the multiphase symbols transmitted through the transmitter 112 according to the states or voltage levels of the 3-wire bus.

For example, in the case where the first symbol +x is transmitted, the voltage level of the first wire A may be ¾ V, the voltage level of the second wire B may be ¼ V, and the voltage level of the third wire C may be ½ V. The receiver 121 may output the first phase of the multiphase symbol as 1 by differentially amplifying the voltage level difference A−B of +½ V of the first and second wires, may output the second phase of the multiphase symbol as 0 by differentially amplifying the voltage level difference B−C of −¼ V of the second and third wires, and may output the third phase of the multiphase symbol as 0 by differentially amplifying the voltage level difference C−A of −¼ V of the third and first wires.

The decoding block 122 may decode multiphase symbols into data. The decoding block 122 may be, for example but not limited to, a 2:5 demapper which decodes 2 multiphase symbols into 5-bit data. The data D<0:n> may be outputted from the decoding block 122. The encoding scheme of the encoding block 111 and the decoding scheme of the decoding block 122 may be complementary to each other. While FIG. 1 illustrates an example in which data are transmitted from the master device 110 to the slave device 120, it is to be noted that the embodiment is not limited to such an example. The slave device 120 may further include components such as the encoding block 111 and the transmitter 112 to transmit data to the master device 110, and the master device 110 may further include components such as the receiver 121 and the decoding block 122 to receive data from the slave device 120.

Referring to FIG. 1, the master device 110 may control the operation of the slave device 120. The master device 110 may execute an operation system and perform various calculation functions in an electronic device. For instance, the master device 110 may include a processor, and the processor may include, for example but not limited to, a central processing unit (CPU), a graphic processing unit (GPU), a multimedia processor (MMP) or a digital signal processor (DSP). The master device 110 may be realized in the form of a system-on-chip (SoC) by combining processor chips having various functions, such as application processors.

The slave device 120 may perform various operations by being controlled by the master device 110. The slave device 120 may include components all of which operate by being controlled by the master device 110. For example, the slave device 120 may include, for example but not limited to, a system memory, a power controller, or a module such as a communication module, a multimedia module and an input/output module capable of performing various functions. For instance, the slave device 120 may be a memory device. The memory device may include, for example but not limited to, a volatile memory device such as an SRAM (static RAM), a DRAM (dynamic RAM) and an SDRAM (synchronous DRAM) or may include at least one of nonvolatile memory devices such as a ROM (read only memory), a PROM (programmable ROM), an EEPROM (electrically erasable and programmable ROM), an EPROM (electrically programmable ROM), a flash memory, a PRAM (phase change RAM), an MRAM (magnetic RAM), an RRAM (resistive RAM) and an FRAM (ferroelectric RAM).

Figure 2:
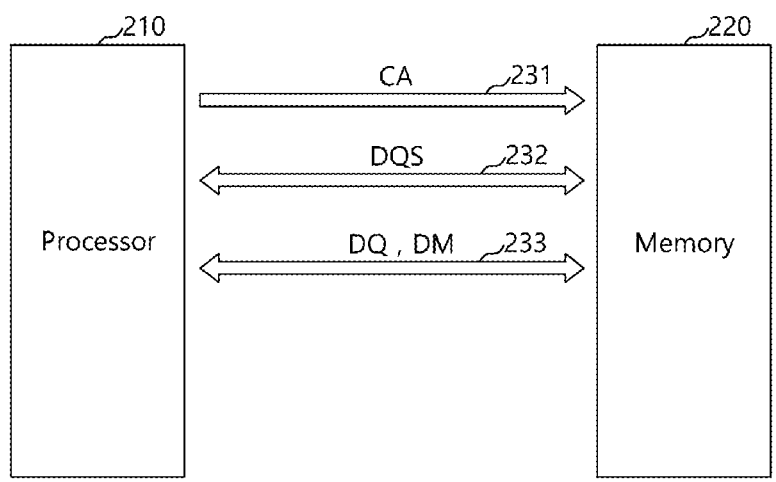
FIG. 2 is a diagram illustrating a representation of an example of the configuration of a memory system in accordance with an embodiment.

FIG. 2 is a diagram illustrating a representation of an example of the configuration of a memory system 2 in accordance with an embodiment. Referring to FIG. 2, the memory system 2 may include a processor 210 and a memory 220. The processor 210 may be applied as the master device 110 illustrated in FIG. 1, and the memory 220 may be applied as the slave device 120 illustrated in FIG. 1.

Generally, a processor and a memory may communicate through a plurality of buses. The plurality of buses may include various kinds of buses such as, for example but not limited to, a command bus, an address bus, a clock bus, a data bus, a data strobe bus, a data mask bus, and so forth. The processor 210 and the memory 220 of the memory system 2 may communicate in a balanced code multiphase signal transmission scheme. The processor 210 and the memory 220 may be coupled by a wire bus. For example, the wire bus may be a 3-wire bus, the wire bus may include a plurality of wire groups, and each wire group may include 3 wires to transmit a 3-phase balanced code. A wire group 231 among the wire groups may be used to transmit a command and address signal CA, in place of a command and address bus, and another wire group 232 may be used to transmit a data strobe signal DQS. A remaining wire group 233 may be used to transmit data DQ, in place of a data bus. The wire group 233 for transmitting the data DQ may transmit a data masking signal DM together with the data DQ. The data masking signal DM may have information that causes specified data not to be stored in the memory 220.

The processor 210 may include an interface circuit, and the interface circuit may include the encoding block 111 and the transmitter 112 illustrated in FIG. 1. The memory 220 may include an interface circuit, and the interface circuit may include the receiver 121 and the decoding block 122 illustrated in FIG. 1. The processor 210 may generate a plurality of multiphase symbols by encoding together the data DQ to be transmitted to the memory 220 and the data masking signal DM. The plurality of multiphase symbols may be sequentially transmitted in synchronization with the data strobe signal DQS. The plurality of multiphase symbols may be transmitted to the memory 220 through a 3-wire bus. The memory 220 may receive the multiphase symbols from the processor 210, and may recover the data DQ and the data masking signal DM by decoding the multiphase symbols.

The processor 210 may control various operations of the memory 220 including, for example but not limited to, a write operation and a read operation. During the write operation, the processor 210 may encode the command and address signal CA into a plurality of multiphase symbols, and transmit the plurality of multiphase symbols to the memory 220 through the wire group 231. The processor 210 may transmit the data strobe signal DQS to the memory 220 through the wire group 232, and may encode the data DQ and the data masking signal DM into a plurality of multiphase symbols and transmit the plurality of multiphase symbols to the memory 220 through the wire group 233. During the read operation, the processor 210 may encode the command and address signal CA into a plurality of multiphase symbols, and transmit the plurality of multiphase symbols to the memory 220 through the wire group 231. During the read operation, the memory 220 may transmit the data strobe signal DQS to the processor 210 through the wire group 232, and may encode the data DQ into a plurality of multiphase symbols and transmit the plurality of multiphase symbols to the processor 210 through the wire group 233.

Figure 3:
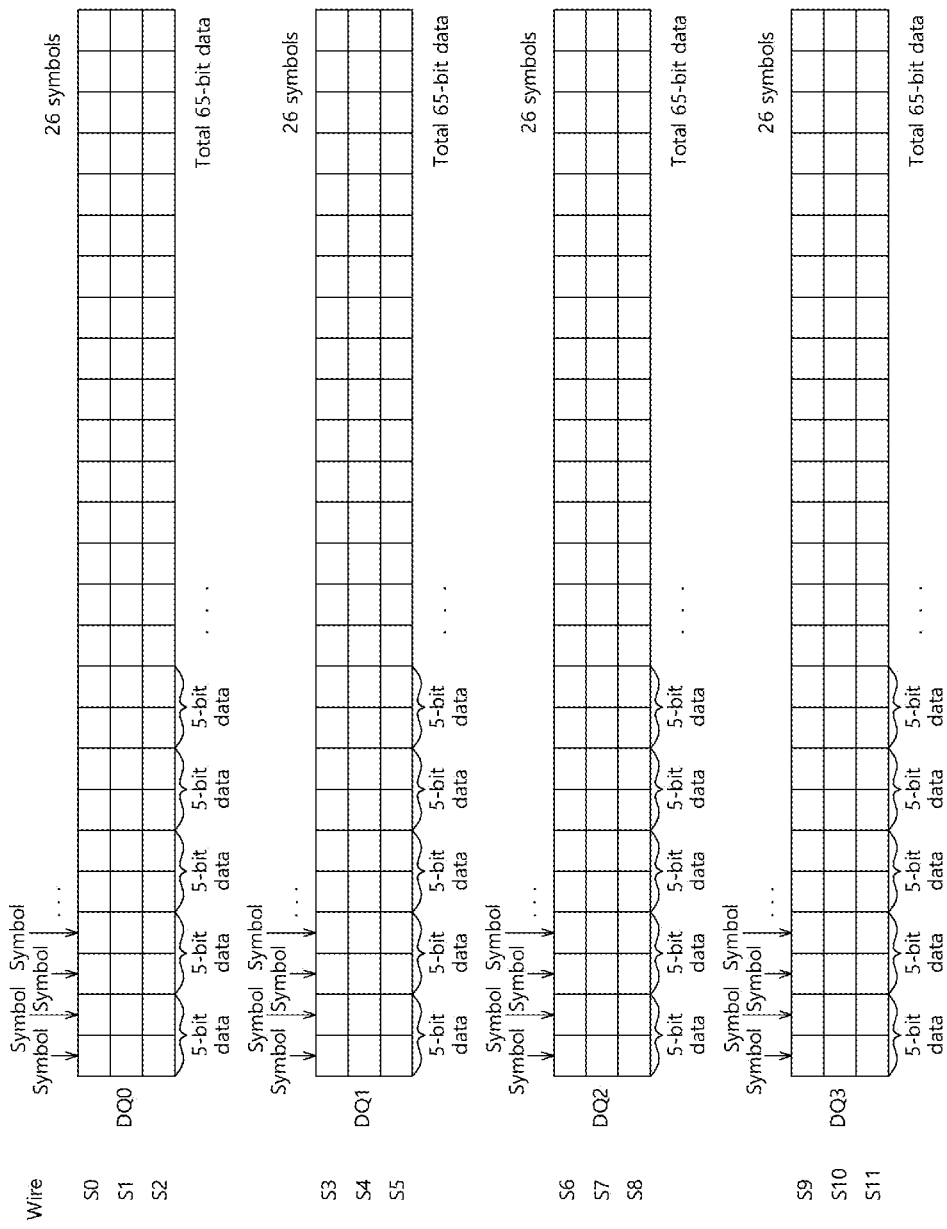
FIG. 3 is a diagram illustrating representations of examples of symbols transmitted through a wire bus in the memory system of FIG. 2.

FIG. 3 is a diagram illustrating representations of examples of symbols transmitted through a wire bus in the memory system 2 illustrated in FIG. 2. FIG. 3 illustrates an example in which symbols are transmitted through 4 wire groups. In FIG. 3, a first wire group may include three wires S0, S1 and S2, and may correspond to a first data bus DQ0. For example, in the case where the processor 210 sequentially transmits 26 symbols through the first wire group, the memory 220 may generate total 65-bit data from the 26 symbols. The memory 220 may generate 5-bit data from 2 symbols which are successively received. The 65-bit data may be configured by total 8 byte data. Accordingly, 1 bit among 65 bits may not be used as data, and may be utilized as a signal for another use. A second wire group may include 3 wires S3, S4 and S5, and may sequentially transmit other 26 symbols simultaneously with the first wire group. The second wire group may correspond to a second data bus DQ1. A third wire group and a fourth wire group may respectively include 3 wires S6, S7, S8, S9, S10 and S11, and may sequentially transmit respectively different 26 symbols simultaneously with the first wire group and the second wire group. The third wire group and the fourth wire group may respectively correspond to third and fourth data buses DQ2 and DQ3. The processor 210 may transmit total 104 multiphase symbols through the 4 wire groups, and the memory 220 may generate total 256-bit data and a 4-bit signal which may be used for an additional use, from the multiphase symbols. Even when the memory 220 transmits data to the processor 210, multiphase symbols may be transmitted through the respective wire groups in the same scheme.

FIG. 4 is a representation of an example of a table to assist in the explanation of an operation of converting multiphase symbols into data in accordance with an embodiment. FIG. 4 may illustrate the operation of the decoding block 122 illustrated in FIG. 1. The decoding block 122 may decode a plurality of multiphase symbols and generate data. The decoding block 122 may be a 2:5 demapper. The decoding block 122 may generate 5-bit data based on 2 successive symbols. For example, the decoding block 122 may receive 8 symbols which are successively inputted, and may generate 4 5-bit data based on the 8 symbols. The decoding block 122 may generate a first 5-bit data based on a first inputted symbol and a second inputted symbol, may generate a second 5-bit data based on a third inputted symbol and a fourth inputted symbol, may generate a third 5-bit data based on a fifth inputted symbol and a sixth inputted symbol, and may generate a fourth 5-bit data based on a seventh inputted symbol and an eighth inputted symbol.

The decoding block 122 may generate data based on some phases of a symbol which is inputted first and all phases of a symbol which is inputted second. The decoding block 122 may provide the first and third phases of a symbol which is inputted first, as the first and second bits of the data. Also, the decoding block 122 may provide the first to third phases of a symbol which is inputted second, as the third to fifth bits of the data. Since the decoding block 122 provides the phases of a symbol which is inputted second, as they are, as the third to fifth bits of the data, a latency for generation of data may be decreased, and the decoding block 122 may be realized by a substantially simple logic.

Referring to the table, rows may represent symbols which are inputted first, and columns may represent symbols which are inputted second. In the table, the part denoted by the thick solid line represents data which are generated based on the symbols which are inputted first and second. In the case where a symbol which is inputted first is the first symbol +x and a symbol which is inputted second is also the first symbol +x, first and third phases 1, 0 of the first symbol +x which is inputted first may be provided as the first and second bits of data, and first to third phases 1, 0, 0 of the first symbol +x which is inputted second may be provided as the third to fifth bits of the data. Accordingly, 5-bit data with the logic levels of 1, 0, 1, 0, 0 may be generated. In the case where a symbol which is inputted first is the first symbol +x and a symbol which is inputted second is the second symbol −x, first and third phases 1, 0 of the first symbol +x which is inputted first may be provided as the first and second bits of data, and first to third phases 0, 1, 1 of the second symbol −x which is inputted second may be provided as the third to fifth bits of the data. Accordingly, 5-bit data with the logic levels of 1, 0, 0, 1, 1 may be generated. Similarly, even in the cases where a symbol which is inputted first is the first symbol +x and the third to sixth symbols +y, −y, +z and −z are respectively inputted second, 5-bit data having logic levels corresponding to the phases of the respective symbols may be generated.

In the example where a symbol which is inputted first is the second symbol −x, the first and second bits of the data generated from the decoding block 122 may correspond to first and third phases 0, 1 of the second symbol −x. Accordingly, the first and second bits of the data may have the logic levels of 0, 1. The third to fifth bits of the data may have logic levels respectively corresponding to the first to third phases of a symbol which is inputted second. In the case where a symbol which is inputted first is the third symbol +y, the first and second bits of the data generated from the decoding block 122 may correspond to first and third phases 0, 0 of the third symbol +y. Accordingly, the first and second bits of the data may have the logic levels of 0, 0. The third to fifth bits of the data may have logic levels respectively corresponding to the first to third phases of a symbol which is inputted second. In the case where a symbol which is inputted first is the fourth symbol −y, the first and second bits of the data generated from the decoding block 122 may correspond to first and third phases 1, 1 of the fourth symbol −y. Accordingly, the first and second bits of the data may have the logic levels of 1, 1. The third to fifth bits of the data may have logic levels respectively corresponding to the first to third phases of a symbol which is inputted second.

In the example where a symbol which is inputted first has specified phases, the decoding block 122 may generate 5-bit data by using some phases of a symbol which is inputted second and a preset logic level. In the case where a symbol which is inputted first is a symbol which has specified phases, the decoding block 122 may provide the first and third phases of a symbol which is inputted second, as the first and second bits of data, and provide a first level as the third to fifth bits of the data. The first level may be a low level. In the example where a symbol which is inputted first is a symbol which has other specified phases, the decoding block 122 may provide the first and third phases of a symbol which is inputted second, as the first and second bits of data, and provide a second level as the third to fifth bits of the data. The second level may be a high level. For example, in the case where a symbol which has specified phases is the fifth symbol +z, the third to fifth bits of data may be 0, 0, 0, respectively, and the first and second bits of the data may correspond to the first and third phases of a symbol which is inputted second. For example, in the case where a symbol which is inputted second is the third symbol +y, since the first and third phases of the third symbol +y are 0, 0, respectively, the data generated from the decoding block 122 may be 0, 0, 0, 0, 0. In the case where a symbol which has other specified phases is the sixth symbol −z, the third to fifth bits of data may be 1, 1, 1, respectively, and the first and second bits of the data may correspond to the first and third phases of a symbol which is inputted second. For example, in the case where a symbol which is inputted second is the third symbol +y, the data generated from the decoding block 122 may be 0, 0, 1, 1, 1.

Since the multiphase symbols include the first to sixth symbols +x, −x, +y, −y, +z and −z, the number of combinations of data which may be generated from combinations of the first to sixth symbols +x, −x, +y, −y, +z and −z is 36. However, because the number of 5-bit data is 32, 32 combinations among the combinations of the first to sixth symbols +x, −x, +y, −y, +z and −z may be generated as 32 different 5-bit data. The remaining 4 combinations among the combinations of the first to sixth symbols +x, −x, +y, −y, +z and −z may be utilized for another use. Accordingly, the decoding block 122 may utilize at least one of the remaining 4 combinations, as data masking information or a data masking signal. When symbols with specified phases are successively inputted, the decoding block 122 may generate a data masking signal DM based on the symbols. In FIG. 4, the symbols with specified phases may be, for example, the fifth symbol +z and the sixth symbol −z. When the fifth symbol +z and the sixth symbol −z are respectively inputted as symbols which are inputted first and second, the decoding block 122 may provide the 2 symbols as the data masking signal DM. While it is described as an example that the fifth symbol +z and the sixth symbol −z are used as symbols for generating the data masking signal DM, it is to be noted that the embodiment is not limited to such an example. Even any 4 combinations of symbols except 32 combinations for generating 5-bit data may be used to generate the data masking signal DM.

The encoding block 111 illustrated in FIG. 1 may be configured by using a logic which is substantially complementary to the decoding block 122. Conversely to the decoding block 122, the encoding block 111 may generate 2 symbols which are successively outputted, based on 5-bit data.

Figure 5:
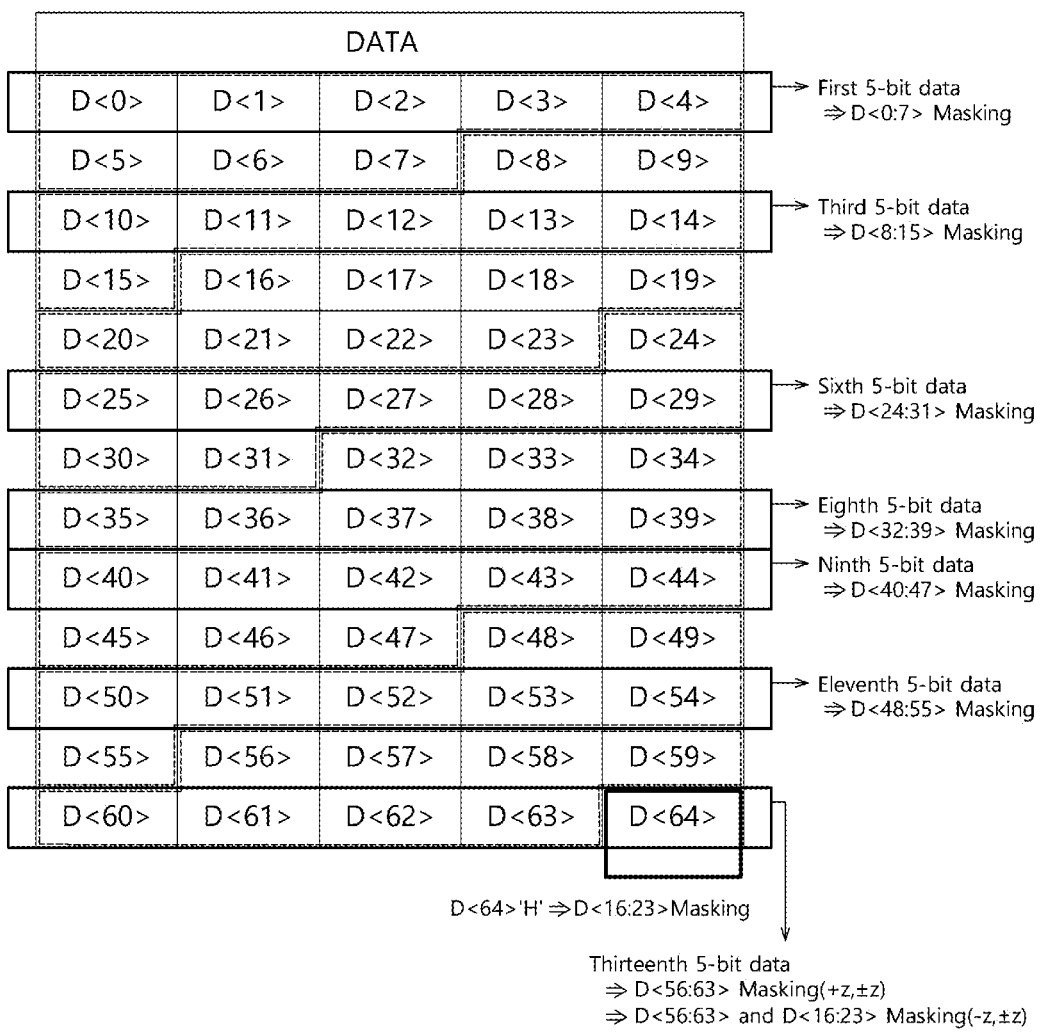
FIG. 5 is a representation of an example of a diagram to assist in the explanation of a method for a processor or a memory to configure data from multiphase symbols transmitted through one wire group.

FIG. 5 is a representation of an example of a diagram to assist in the explanation of a method for a processor or a memory to configure data from multiphase symbols transmitted through one wire group. Referring to FIG. 5, data of first to sixty-fifth bits D<0:64> may be generated from 26 symbols which are transmitted through one wire group. The data of the first to sixty-fifth bits D<0:64> may be divided into first to thirteenth 5-bit data. Each of the first to thirteenth 5-bit data may be generated based on 2 symbols which are successively inputted. The first 5-bit data may correspond to the first to fifth bits D<0:4>, the second 5-bit data may correspond to the sixth to tenth bits D<5:9>, the third 5-bit data may correspond to the eleventh to fifteenth bits D<10:14>, the fourth 5-bit data may correspond to the sixteenth to twentieth bits D<15:19>, the fifth 5-bit data may correspond to the twenty-first to twenty-fifth bits D<20:24>, the sixth 5-bit data may correspond to the twenty-sixth to thirtieth bits D<25:29>, the seventh 5-bit data may correspond to the thirty-first to thirty-fifth bits D<30:34>, the eighth 5-bit data may correspond to the thirty-sixth to fortieth bits D<35:39>, the ninth 5-bit data may correspond to the forty-first to forty-fifth bits D<40:44>, the tenth 5-bit data may correspond to the forty-sixth to fiftieth bits D<45:49>, the eleventh 5-bit data may correspond to the fifty-first to fifty-fifth bits D<50:54>, the twelfth 5-bit data may correspond to the fifty-sixth to sixtieth bits D<55:59>, and the thirteenth 5-bit data may correspond to the sixty-first to sixty-fifth bits D<60:64>.

The first to fifth bits D<0:4> of the first 5-bit data and the first to third bits D<5:7> of the second 5-bit data may configure a first byte. The fourth and fifth bits D<8:9> of the second 5-bit data, the first to fifth bits D<10:14> of the third 5-bit data and the first bit D<15> of the fourth 5-bit data may configure a second byte. The second to fifth bits D<16:19> of the fourth 5-bit data and the first to fourth bits D<20:23> of the fifth 5-bit data may configure a third byte. The fifth bit D<24> of the fifth 5-bit data, the first to fifth bits D<25:29> of the sixth 5-bit data and the first and second bits D<30:31> of the seventh 5-bit data may configure a fourth byte. The third to fifth bits D<32:34> of the seventh 5-bit data and the first to fifth bits D<35:39> of the eighth 5-bit data may configure a fifth byte. The first to fifth bits D<40:44> of the ninth 5-bit data and the first to third bits D<45:47> of the tenth 5-bit data may configure a sixth byte. The fourth and fifth bits D<48:49> of the tenth 5-bit data, the first to fifth bits D<50:54> of the eleventh 5-bit data and the first bit D<55> of the twelfth 5-bit data may configure a seventh byte. Finally, the second to fifth bits D<56:59> of the twelfth 5-bit data and the first to fourth bits D<60:63> of the thirteenth 5-bit data may configure an eighth byte. The fifth bit D<65> of the thirteenth 5-bit data may be used as data masking information.

In the example where a combination of 2 symbols corresponds to data masking information, the processor 210 or the memory 220 may mask data of a byte unit including 5-bit data which may be generated based on the 2 symbols. In the example where a combination of 2 symbols for generating 5-bit data corresponds to data masking information, data of a byte unit including the corresponding 5 bits may be masked. For example, in the case where a combination of symbols which are inputted first and second to generate the data of the first to fifth bits D<0:4> corresponds to data masking information, the data of the first byte may be masked, and, in the case where a combination of symbols which are inputted fifth and sixth to generate the data of the eleventh to fifteenth bits D<10:14> corresponds to data masking information, the data of the second byte may be masked.

In the example where a combination of symbols which are inputted eleventh and twelfth to generate the data of the twenty-sixth to thirtieth bits D<25:29> corresponds to data masking information, the data of the fourth byte may be masked. In the example where a combination of symbols which are inputted fifteenth and sixteenth to generate the data of the thirty-sixth to fortieth bits D<35:39> corresponds to data masking information, the data of the fifth byte may be masked. In the example where a combination of symbols which are inputted seventeenth and eighteenth to generate the data of the forty-first to forty-fifth bits D<40:44> corresponds to data masking information, the data of the sixth byte may be masked. In the example where a combination of symbols which are inputted twenty-first and twenty-second to generate the data of the fifty-first to fifty-fifth bits D<50:54> corresponds to data masking information, the data of the seventh byte may be masked.

In order to mask the third byte and the eighth byte, an additional scheme is needed. The data of the third byte may be configured by the second to fifth bits D<16:19> of the fourth 5-bit data and the first to fourth bits D<20:23> of the fifth 5-bit data. The first bit D<15> of the fourth 5-bit data may be included in the data of the second byte, and the fifth bit D<24> of the fifth 5-bit data may be included in the data of the fourth byte. Accordingly, if the third byte is masked as a combination of symbols for generating the fourth or fifth 5-bit data, a problem may be caused in that even the data included in the second and fourth bytes are masked. In an embodiment, the sixty-fifth bit D<64> may be used to mask the data of the 3 byte. For example, in the case where the sixty-fifth bit D<64> is a first level, the data of the third byte may be masked, and, in the case where the sixty-fifth bit D<64> is a second level, the data of the third byte may not be masked. The first level may be a high level, and the second level may be a low level. However, since the sixty-fifth bit D<64> is included in the thirteenth 5-bit data, in the example where a combination of 2 symbols for generating the data of the thirteenth 5-bit data corresponds to data masking information, an additional scheme capable of precisely masking the data of the third and eighth bytes is needed. In an embodiment, in the example where a combination of symbols which are inputted twenty-fifth and twenty-sixth to generate the data of the sixth-first to sixth-fifth bits D<60:64> corresponds to data masking information, the data of at least one of the third and eighth bytes may be masked. For example, the data of the eighth byte may be masked in the case where the combination of the symbols is a first combination, and the data of the third byte may be masked in the case where the combination of the symbols is a second combination. Making descriptions with reference to FIG. 4, in the example where the symbol which is inputted twenty-fifth is the fifth symbol +z and the symbol which is inputted twenty-sixth is any one of the fifth symbol +z and the sixth symbol −z, the data of only the eighth byte may be masked. Also, in the example where the symbol which is inputted twenty-fifth is the sixth symbol −z and the symbol which is inputted twenty-sixth is any one of the fifth symbol +z and the sixth symbol −z, the data of both the third and eighth bytes may be masked. While combinations of symbols are described as an example, the first and second combinations may be reversed, and, if symbols to be used as masking information are changed, the first and second combinations may be changed accordingly.

Figure 6:
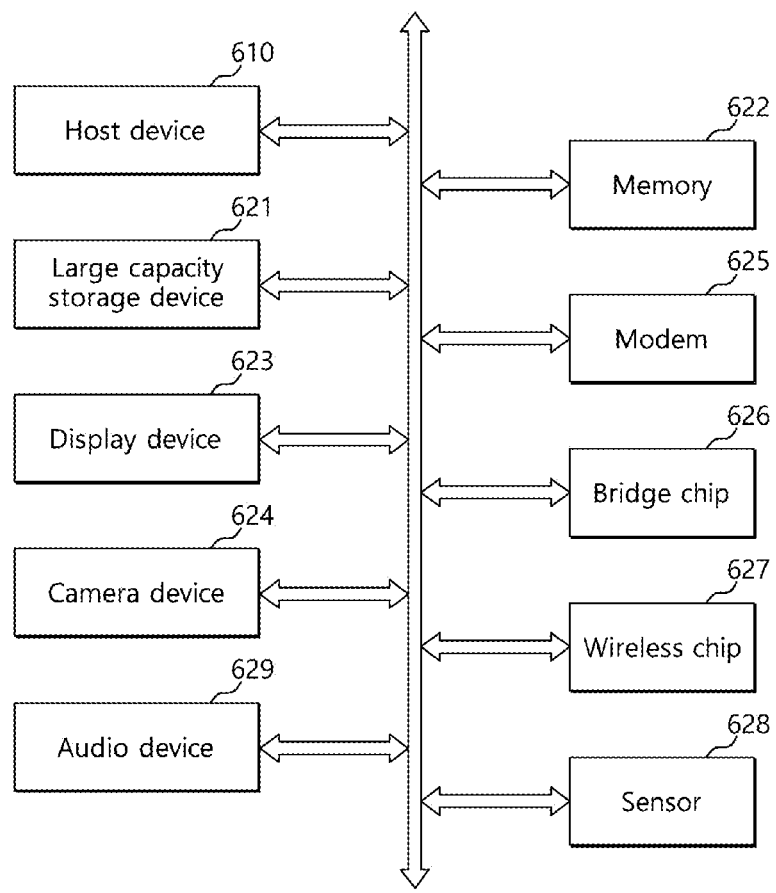
FIG. 6 is a diagram illustrating a representation of an example of a system including electronic components which use the balanced code multiphase signal transmission scheme described with reference to FIGS. 1 to 5.

FIG. 6 is a diagram illustrating a representation of an example of a system including electronic components which use the balanced code multiphase signal transmission scheme described with reference to FIGS. 1 to 5. Referring to FIG. 6, the system 6 may include a host device 610, a large capacity storage device 621, a memory 622, a display device 623, a camera device 624, a modem 625, a bridge chip 626, a wireless chip 627, a sensor 628, and an audio device 629. The host device 610 may communicate with the remaining components by forming respective individual links. The components for an electronic device illustrated in FIG. 6 are illustrations of representations of the components, and it is to be noted that the system 6 may include any components capable of performing data communication with the host device 610.

The host device 610 may include at least one integrated circuit device such as an application processor and an application specific integrated circuit (ASIC). The large capacity storage device 621 may include at least one storage device such as a solid state drive (SSD) and a flash drive through USB coupling. The memory 622 may include any kinds of memory devices. For example, the memory 622 may include, for example but not limited to, a volatile memory device such as a DRAM (dynamic RAM), or may include a nonvolatile memory device such as a ROM (read only memory), a PROM (programmable ROM), an EEPROM (electrically erasable and programmable ROM), an EPROM (electrically programmable ROM), a FLASH memory, a PRAM (phase change RAM), an MRAM (magnetic RAM), an RRAM (resistive RAM) and an FRAM (ferroelectric RAM).

The host device 610 may communicate with the large capacity storage device 621 and the memory 622 by forming respective links. The host device 610, the large capacity storage device 621 and the memory 622 may include the interface circuits illustrated in FIGS. 1 and 2, and may exchange signals with one another in a serial communication scheme. Similarly, the host device 610 may communicate serially with the display device 623, the camera device 624, the modem 625, the bridge chip 626, the wireless chip 627, the sensor 628 and the audio device 629 by forming individual links.

While various embodiments have been described above, it will be understood to those skilled in the art that the embodiments described are examples only. Accordingly, the interface circuit for high speed communication and the system including the same described herein should not be limited based on the described embodiments.

What is claimed is:

1. An interface circuit comprising:
a receiver configured to generate symbols having phases based on states of a wire bus; and
a decoding block configured to successively receive the symbols and each of the symbols, and generate data having a number of bits based on the symbols,
wherein data of a byte including the number of bits generated based on the symbols is masked where a combination of the symbols correspond to data masking information.

2. The interface circuit according to claim 1,
wherein the decoding block is configured to successively receive 2 symbols and each of the symbols includes 3 phases, and generates the data having 5 bits based on the 2 symbols, and
wherein the data of the byte including the 5 bits is masked where the combination of the 2 symbols correspond to the data masking information.

3. The interface circuit according to claim 2, wherein the interface circuit generates data of 65 bits from 26 symbols which are sequentially received.

4. The interface circuit according to claim 2, wherein the interface circuit masks data of a first byte where a combination of 2 symbols for generating first to fifth bits corresponds to data masking information, and masks data of a second byte where a combination of 2 symbols for generating eleventh to fifteenth bits corresponds to data masking information.

5. The interface circuit according to claim 4, wherein data of a third byte is masked based on information of a sixty-fifth bit.

6. The interface circuit according to claim 4, wherein the interface circuit masks data of a fourth byte where a combination of 2 symbols for generating data of twenty-sixth to thirtieth bits corresponds to data masking information, masks data of a fifth byte where a combination of 2 symbols for generating data of thirty-sixth to fortieth bits corresponds to data masking information, masks data of a sixth byte where a combination of 2 symbols for generating data of forty-first to forty-fifth bits corresponds to data masking information, and masks data of a seventh byte where a combination of 2 symbols for generating data of fifty-first to fifty-fifth bits corresponds to data masking information.

7. The interface circuit according to claim 4, wherein the interface circuit masks data of at least one of the third byte and an eighth byte where a combination of 2 symbols for generating data of sixty-first to sixty-fifth bits corresponds to data masking information.

8. The interface circuit according to claim 7, wherein the interface circuit masks the data of the eighth byte where a combination of 2 symbols for generating data of the sixty-first to sixty-fifth bits is a first combination.

9. The interface circuit according to claim 8, wherein the interface circuit masks the data of both the third and eighth bytes where a combination of 2 symbols for generating data of the sixty-first to sixty-fifth bits is a second combination.

10. A system comprising:
a processor; and
a memory configured to communicate with the processor through a wire bus,
the memory comprising:
a receiver configured to generate multiphase symbols based on states of the wire bus; and
a decoding block configured to generate data, based on multiphase symbols which are successively inputted,
wherein the memory masks data of a byte including a number of bits generated based on the multiphase symbols, where a combination of the multiphase symbols corresponds to data masking information.

11. The system according to claim 10,
wherein the decoding block is configured to generate data of 5 bits based on 2 multiphase symbols which are successively inputted, and
wherein the memory masks data of the byte including the 5 bits, where a combination of the 2 multiphase symbols corresponds to the data masking information.

12. The system according to claim 11, wherein the memory generates data of 65 bits from 26 symbols which are sequentially inputted.

13. The system according to claim 11, wherein the memory masks data of a first byte where a combination of 2 symbols for generating first to fifth bits corresponds to data masking information, and masks data of a second byte where a combination of 2 symbols for generating eleventh to fifteenth bits corresponds to data masking information.

14. The system according to claim 13, wherein data of a third byte is masked based on information of a sixty-fifth bit.

15. The system according to claim 13, wherein the memory masks data of a fourth byte where a combination of 2 symbols for generating data of twenty-sixth to thirtieth bits corresponds to data masking information, masks data of a fifth byte where a combination of 2 symbols for generating data of thirty-sixth to fortieth bits corresponds to data masking information, masks data of a sixth byte where a combination of 2 symbols for generating data of forty-first to forty-fifth bits corresponds to data masking information, and masks data of a seventh byte where a combination of 2 symbols for generating data of fifty-first to fifty-fifth bits corresponds to data masking information.

16. The system according to claim 13, wherein the memory masks data of at least one of the third byte and an eighth byte where a combination of 2 symbols for generating data of sixty-first to sixty-fifth bits corresponds to data masking information.

17. The system according to claim 16, wherein the memory masks the data of the eighth byte where a combination of 2 symbols for generating data of the sixty-first to sixty-fifth bits is a first combination.

18. The system according to claim 17, wherein the memory masks the data of both the third and eighth bytes where a combination of 2 symbols for generating data of the sixty-first to sixty-fifth bits is a second combination.

* * * * *